United States Patent [19]

Maitland

[11] 4,047,600
[45] Sept. 13, 1977

[54] CONTINUOUS JUNCTION BETWEEN ALUMINUM CONDUCTOR RAILS

[75] Inventor: Alexander Maitland, Schaffhausen, Switzerland

[73] Assignee: Swiss Aluminium Ltd., Chippis, Switzerland

[21] Appl. No.: 600,393

[22] Filed: July 30, 1975

[30] Foreign Application Priority Data

Aug. 28, 1974 Switzerland .................. 11756/74

[51] Int. Cl.² ............................................. B60M 1/30
[52] U.S. Cl. ............................. 191/29 R; 174/94 S; 238/219; 403/28; 403/293; 238/14.4
[58] Field of Search .............. 191/22 R, 28, 29 R, 191/44.1; 174/75 F, 75 D, 75 R, 94 S, 99 E, 108; 339/9 E, 9 RY, 6 R; 403/341, 293, 28; 238/14.05, 14.4, 14.5, 219, 223

[56] References Cited

U.S. PATENT DOCUMENTS

| 1,724,581 | 8/1929 | Hansen | 238/219 |
| 2,843,326 | 7/1958 | Boy | 238/219 |
| 3,790,725 | 2/1974 | Charamel | 191/29 R |

FOREIGN PATENT DOCUMENTS 650,881  10/1937  Germany ................. 191/29

Primary Examiner—Trygve M. Blix
Assistant Examiner—Reinhard J. Eisenzopf
Attorney, Agent, or Firm—Ernest F. Marmorek

[57] ABSTRACT

A smooth junction is provided between aluminum conductor rails at the power collection surface by the provision of a wedge shaped insert the geometry of which corresponds to that of the gap between the rails. On expansion of the rails the insert is pushed partly out of the gap and on contraction is forced into the gap by a spring or springs thus always providing continuity on the power transfer surface.

1 Claim, 6 Drawing Figures

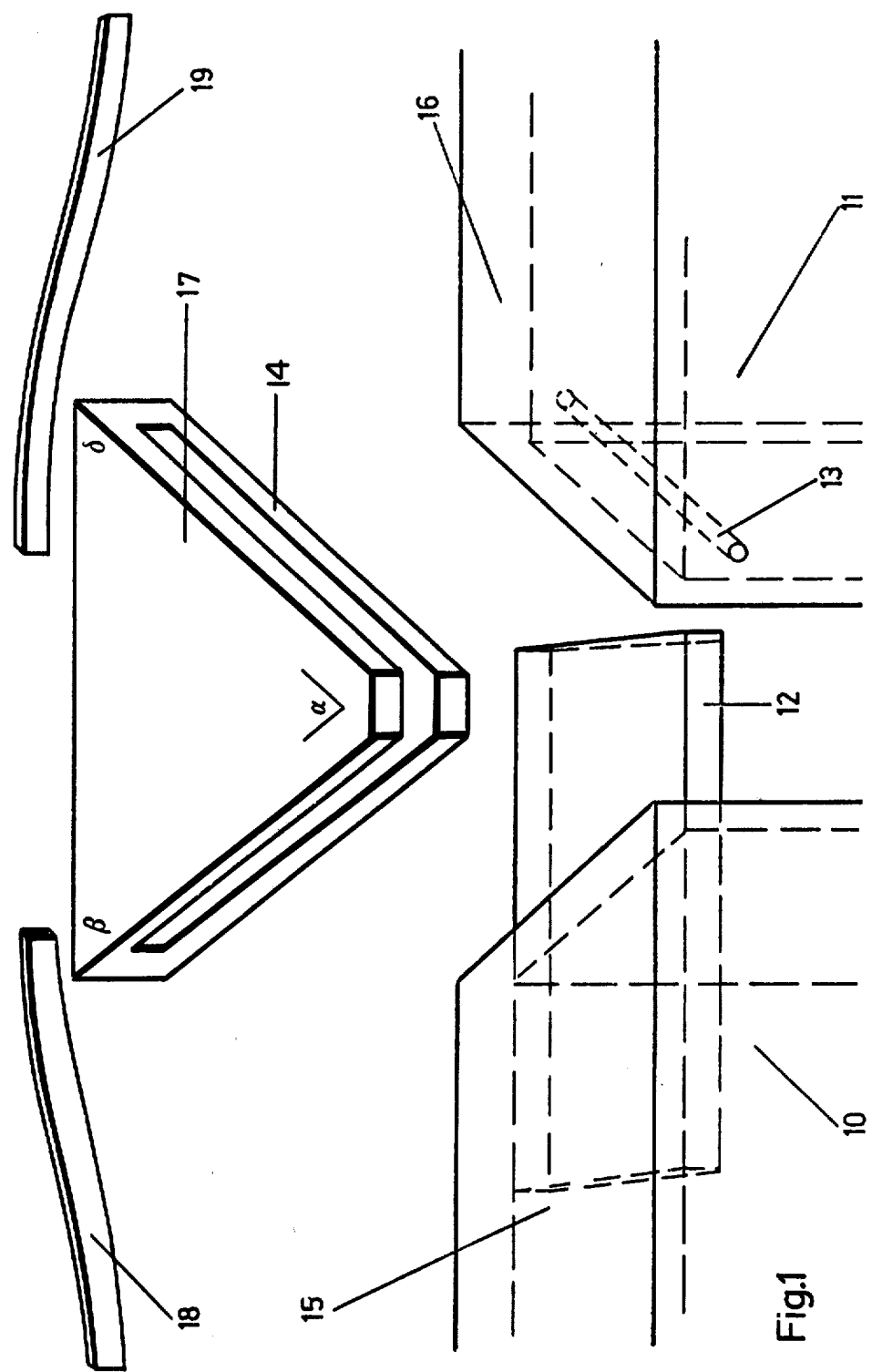

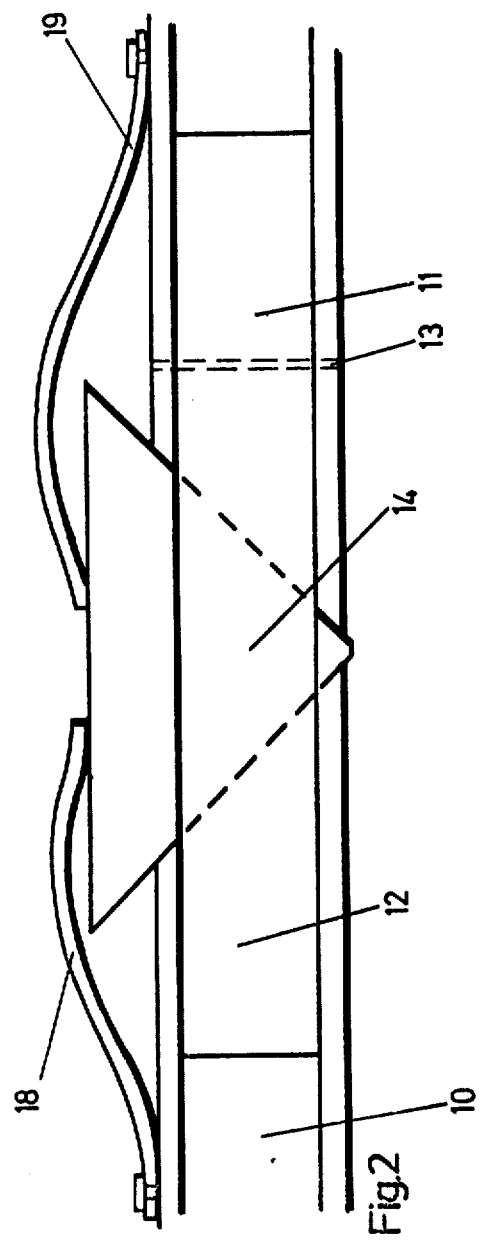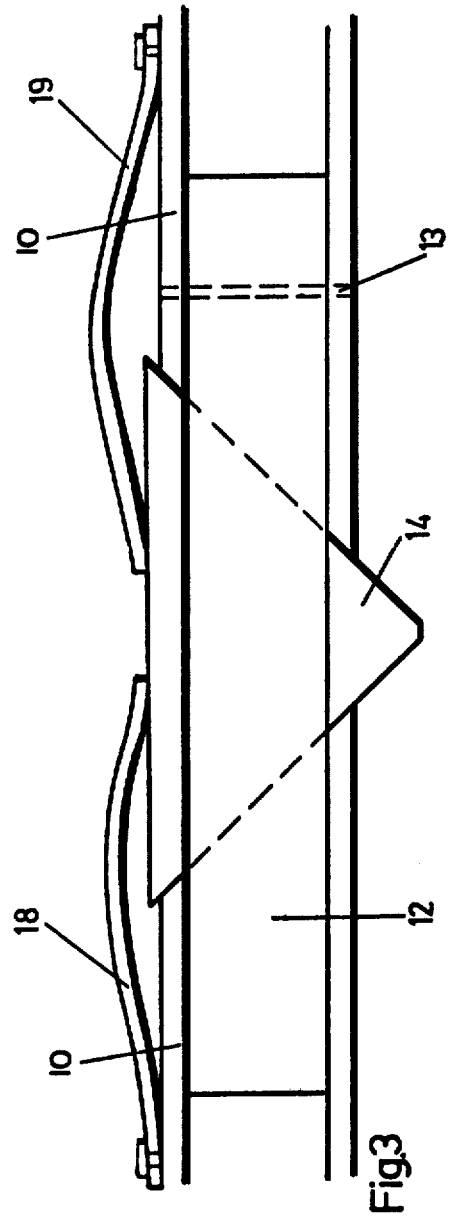

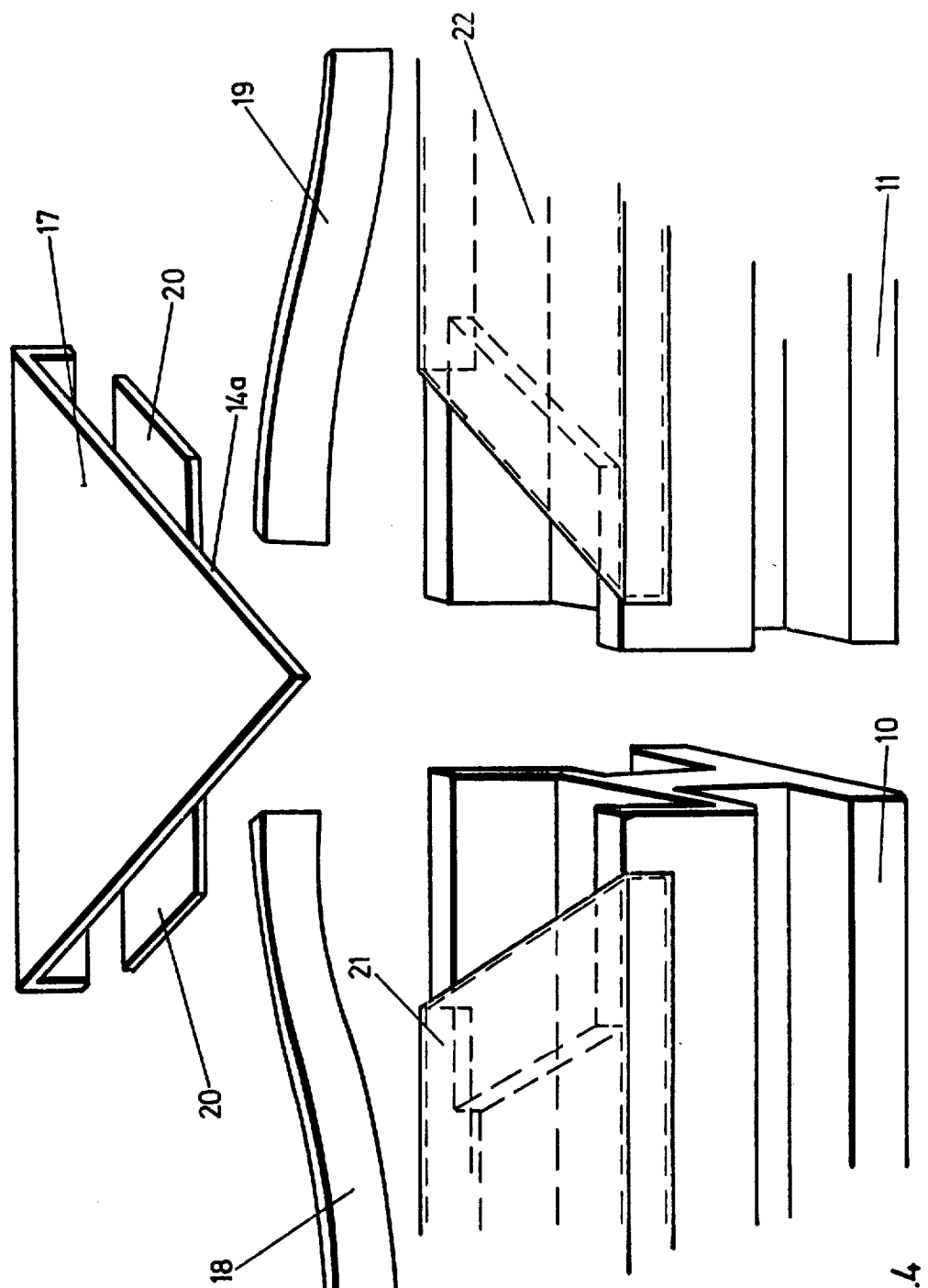

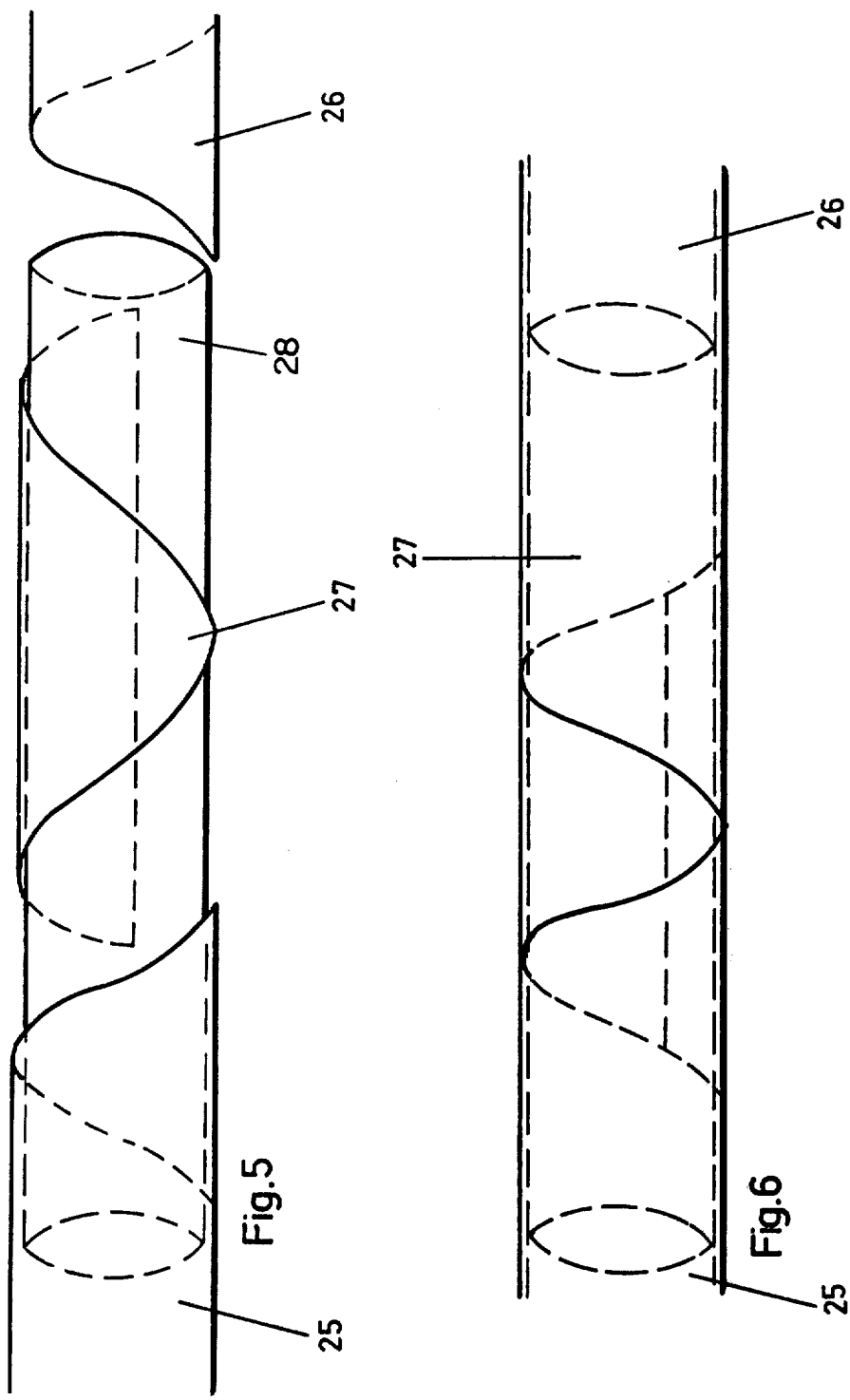

CONTINUOUS JUNCTION BETWEEN ALUMINUM CONDUCTOR RAILS

The invention relates to a process for forming a continuous junction between conductor rails of aluminum or aluminum alloys by means of a wedge shaped insert, to provide a smooth transition for the power collector shoe between the said conductor rails which are provided with a wear resistant coating. In the following, the term aluminum is also to be understood to include aluminum alloys.

Modern electric railways often employ overhead wires to supply electrical power to the vehicle. The power is transferred by means of a sliding contact with the wire. At very high speeds it is difficult to maintain good contact with the wire and so electricl arcing occurs and can even lead to the burning-up of the cable causing a total breakdown of the system.

Another more stable method of supplying the power is by a so-called third rail which runs parallel to the track. This rail is made of steel (and is laid much the same way as the track but is electrically insulated from the ground. Since the electrical conductivity of steel is very low, the amount of power which can be transferred is limited by the normal dimensions of the rail. Also, for AC supplies the so-called skin effect is very pronounced with steel and so the rail would have disproportionate dimensions for modern track systems. There is now therefore a wish to use rails of aluminum since this metal or its alloys have a much higher conductivity than steel, the skin effect is less pronounced and there are other advantages with respect to corrosion resistance and weight. Aluminum and its alloys however have a few disadvantages which have to overcome in order to make the widespread application of aluminum rails possible and economical.

One such problem is that of wear. The aluminum itself is not very wear resistant unless provided with a thick oxide skin. Since this skin is electrically insulating however other coatings, which are both electrically conductive and wear resistant, have been applied to the current transfer surface of the aluminum rail. Steel is typically provided for the coating here and it may be applied by arc-spraying, plasma spraying, clamping, screwing, riveting etc. Other abrasive resistant coatings are applied electrolytically or by coextrusion etc. The net result is that there is a wide variety of rails available today which allow aluminum to be used for conductor rails and these are finding increasing use in new ground transportation systems.

Another problem related to wear arises because aluminum and its alloys have a high coefficient of thermal expansion, typically $24.10^{-6}$ which is about twice that of plain carbon steels. The space which must be left between rails is therefore about twice as great as with steels in order to allow for the large amount of expansion which takes place in summer months. An aluminum rail of 15 m in length would require a gap of up to 3.6 cm for a temperature range of 100° C.

The outcome of having such large gaps between rails is that the collector shoe on the vehicle tends to strike the edge of the next rail each time and there is excessive wear of collector shoe material which is normally of electrographite. Furthermore, such large gaps between rails may cause the shoe to skip upwards and so produce an electric arc which produces further wear both on the shoe and on the rail. New rapid transportation systems anticipate speeds of up to 500 km per hour and the problem with arcing is considered to be a major one as far as supply of power to the vehicle is concerned. Wear of the collector shoe is also very important since the replacement of shoes is costly both in terms of time and material.

Several attempts have been made to overcome this problem of the rail gap. Aluminum rails have been welded together for example, and the prevented from expanding by fixing the rail firmly to insulated supports which prevent the rail from buckling. The compressive or tensile stresses are then taken up by the aluminum itself. This is simply copying the already standard practice in many conventional railroad tracks. The conventional rails however are made of steel and are fixed without insulation. The aluminum rails build up much higher stresses because of the larger coefficient of expansion and therefore require many more anchoring points. Insulated supports are expensive and so the large number of these which are needed, make this solution productively expensive.

Another attempt at solving the problem of wear at the gap has been to cut the rails at 45°-60° to the rail length. It is found that the collector shoe passes over this gap more easily but the amount wear is only slightly less than when the junction is at 90° to the rail length.

A similar development also employs rail ends which make an angle of 45°-60° to the rail length but no gap is allowed. When expansion occurs then the two rail ends slide over each other and are deflected sideways. The disadvantage of this arrangement however is that the whole of the rail breadth may not then be used for current transfer. The outcome is that the transfer surface of the whole rail then has to be overdimensioned by up to 40% excess. Since the coating processes to make the surface abrasion resistant are generally expensive, the overdimensioning also makes this solution very expensive.

The object of the present invention is to provide a process for forming a continuous, smooth transition between successive aluminum conductor rails coated with an abrasion resistant material in which process the difficulties associated with wear and with economics are overcome by obviating the need for a gap between the rails on their power transfer face. The object is fulfilled by providing a wedge shaped insert, which corresponds to the shape of the conductor rail ends, and which is pressed into the gap between the rails.

When the temperature rises the gap between the rails becomes smaller and the wedge shaped insert is pushed outwards and, when the temperature falls and the gap becomes smaller the insert is forced into the gap.

The size of the wedge shaped insert is chosen such that, at all times and in all positions, it is in close contact with the abrasion resistant layer at the conductor rail ends across the whole breadth of the rail.

The parameters which determine the size and shape of the insert are the dimensions of the conductor rail and the expected change in temperature. The insert can for example be made by bending a stamped out sheet, from a suitably shaped extrusion or by assembling various components. The thickness of any part of the wedge shaped insert can be varied so that weight can be saved or so that another desirable property results from the change. Usefully this insert is made of steel, copper, aluminum, nickel, bronze, brass or another alloy of these metals, but in all cases the material of the insert must be compatible with the material of the conductor rails with the material of the conductor rails with respect to corrosion and should furthermore be reasonably priced.

The wedge shaped insert can, in an analogous manner to the aluminum conductor rail, be provided with an abrasion resistant power transfer surface e.g. by means of electrochemical deposition, arc or plasma spraying, mechanical clamping, screwing, riveting or shrink fitting a suitable layer onto the power transfer surface. This surface coating is advantageously made of an alloy of iron such as steel. It can however also be made of an alloy of the metals Ni, Cr or Cu or of such metals which provide the layer with the necessary abrasion resistance.

In order to raise the corrosion resistance and the sliding properties of the insert, a suitable lubricant e.g. grease, can be applied to the contacting surface.

The simplest and most economical way of forcing the wedge shaped insert between the conductive rail ends is to provide a spring which acts on the insert. There are however very many other possibilities which can be used e.g. using the force of gravity, magnetic or hydrostatic forces, pressing by means of a cam or a bimetallic strip.

Since the conductor rail can have many different shapes and sizes it may be advantageous to connect the wedge shaped insert to the rails by means of a flexible cable, so that the electric power can also be transferred from the inserts. Of course the use of a cable makes sense only when the insert and its abrasion resistant layer are made of electrically conductive materials.

By appropriate choice of material it is furthermore also possible to use the springs which press in the insert or coatings on the springs as electrical conductors whereby the pressure exerted by the springs ensures a low contact resistance.

Depending on the change in length expected in the conductor rail the ends of the rail coming in contact with the wedge shaped insert are cut at an angle between 20° and 160°, preferably 60° to 120° to the lengthwise direction.

Both conductor rails are electrically joined by means of a flexible cable or another suitable device.

The conductor rails of the invention with continuous junction of the power transfer surfaces are in particular conceived to be for the conduction of electrical energy to the motors of a vehicle for rapid transit or for a conventional underground railway. A further possibility for application is in the induction rails for rapid transit vehicles which are being increasingly discussed nowadays, these induction rails being made out of an aluminum alloy with high ohmic resistance.

Various embodiments of the continuous junction of conductor rails are illustrated schematically in the accompanying figures:

FIG. 1 An exploded perspective view of two rail ends and an insert.

FIG. 2 A top view of the junction between two rail ends and a wedge shaped insert in a position when the rails are warm and therefore long.

FIG. 3 A top view of the junction shown in FIG. 2 showing the position of the insert when the rails are cold and therefore shorter.

FIG. 4 An exploded, perspective view of two rail ends and a wedge shaped insert with separate abrasion resistant power transfer layer.

FIG. 5 An exploded, perspective view of two tube shaped conductor rail ends and an insert.

FIG. 6 A perspective view of the junction of two tube shaped rail ends.

In the example shown in FIG. 1 the ends of the conductor rails 10, 11 are cut at an angle of 45° to the length of the rails. As a result of this there exists a space which when the rails are brought together, is right angled. In the space inside the rail 10 a support sheet 12 of rigid material is firmly fixed by means of a known method. In the other rail 11 a pin 13 of steel, aluminum or another rigid material is positioned such that when the rail ends are placed together the support sheet 12 can be fitted between the upper inside surface of the rail and the pin 13. The support sheet 12 is so dimensioned that it fits neatly but without requiring any force inside the rail 11 and is of such a length that regardless of the width of the gap between rails 10 and 11 produced by the change of temperature it always extends beyond the pin 13. In this way vibration is also prevented.

The insert 14 is dimensioned such that on the one hand it rests on the support sheet 12, on the other hand completely fills the gap between the rails 10 and 11 at the power transfer surface 15 and ensures for the current collector a smooth junction between the power transfer surfaces 15 and 16 of the rails 10 and 11 and the surfaces 17 of the insert.

The working surface 17 of the insert 14 must also be abrasion resistant and at the same time slide easily on the support sheet 12. In a preferred embodiment stainless and corrosion resistant steel is used for the insert and the support sheet. However other pairs of materials, which have the requisite abrasion resistance and good sliding properties, can be used for the manufacture of inserts and support sheet.

The angle $\alpha$ of the insert 14 is usefully between 60° and 120°, the angles $\beta$ and $\gamma$ to advantage 90° at maximum and usefully equal in size, and the insert is seen in a top view is to advantage an isoceles triangle. The way the insert acts as a wedge is shown in FIGS. 2 and 3

As the temperature of the rails rises the inserts is forced out of the gap between the rails which becomes smaller (FIG. 2)

As the temperature of the rails falls the insert is forced into the increasingly larger gap between the conductor rails by springs 18, 19 which are fixed to the conductor rails 10, 11 (FIG. 3).

In FIG. 4 further embodiment of the invention is illustrated in which no support sheet held by the rail end is provided. In this case the abrasion resistant power transfer layers 21 and 22, which are cut just before the end of the rail ends, are removable components of the conductor rail. At the rail ends the top of the aluminum sections 10 and 11 are cut away so far that the power transfer surfaces 21 and 22 project out beyond this recess. The wedge shaped insert 14a is inserted between the conductor rail ends so that its support sheet 20 lies directly under the power transfer layer, which prevents the insert from being removed accidentally from its correct position. The thickness of the insert layer 14a corresponds to that of the abrasion resistant power transfer layer of the conductor rails 21 and 22 and ensures then a continuous power transfer surface between the rails 20 and 21.

FIG. 5 shows two conductor rail ends 25, 26 of round cross section with correspondingly shaped insert 27 and support cyliner 28. The principle is similar to that shown in FIGS. 1 - 3. The insert 27 however is not moved in a linear direction out of or into the gap between the rails, but instead rotates around the axis of the conductor rails 25, 26. This rotation can on shrinkage of the rails, be effected for example by springs which are not shown.

What I claim is:

1. A conductor rail junction for use in connection with a power collector shoes, comprising, in combination:

at least two aluminum or aluminum alloy rails disposed end to end and each having an abrasive resistant electrical power transfer layer adapted for contact by said power collector shoe;

each of the ends of said rails facing each other having a surface having an angle of from about 60° to about 120° with respect to the length of said rails and defining a gap;

an insert composed of a metal selected from the group consisting of steel, iron, copper, aluminum, nickel, bronze, brass, and alloys of these metals or combinations of these metals and having a shape complementary to said gap and engaging said gap, said insert having a shape in its plan view of at least a trucated isosceles triangle, whereby a substantially continuous surface is obtained even if the size of said gap undergoes any change;

supporting means operable for engaging the ends of said rails and for supporting said insert; and connecting means adapted to interconnect electrically said rails to each other.

* * * * *